US007574068B2

(12) United States Patent
Hung

(10) Patent No.: US 7,574,068 B2
(45) Date of Patent: Aug. 11, 2009

(54) IMAGE DISPLAY APPARATUS, IMAGE DISPLAY METHOD AND IMAGE DISPLAY PROGRAM

(75) Inventor: Po-Chieh Hung, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 658 days.

(21) Appl. No.: 11/135,205

(22) Filed: May 23, 2005

(65) Prior Publication Data

US 2005/0265620 A1 Dec. 1, 2005

(30) Foreign Application Priority Data

May 28, 2004 (JP) ............................ 2004-159532

(51) Int. Cl.
*G06K 9/40* (2006.01)
*G09G 5/10* (2006.01)

(52) U.S. Cl. ...................................... 382/274; 345/690

(58) Field of Classification Search ................. 382/254, 382/284, 294, 307, 325, 255–275; 715/700, 715/716, 719, 720, 722, 723; 345/690–697
See application file for complete search history.

(56) References Cited

U.S. PATENT DOCUMENTS

| | | | | | |
|---|---|---|---|---|---|
| 5,355,450 | A * | 10/1994 | Garmon et al. | ............. | 345/501 |
| 5,617,863 | A * | 4/1997 | Roundhill et al. | ........... | 600/447 |
| 5,742,356 | A * | 4/1998 | Suzuki | ....................... | 348/607 |
| 5,963,192 | A * | 10/1999 | Wong et al. | ................. | 345/593 |
| 6,084,914 | A * | 7/2000 | Katata et al. | ................ | 375/240 |
| 7,009,627 | B2 * | 3/2006 | Abe et al. | ................... | 345/690 |
| 7,218,777 | B2 * | 5/2007 | Asano et al. | ................ | 382/168 |
| 7,414,622 | B2 * | 8/2008 | Abe et al. | ................... | 345/204 |
| 2003/0120365 | A1 * | 6/2003 | Asano et al. | .................. | 700/86 |
| 2003/0122759 | A1 * | 7/2003 | Abe et al. | ..................... | 345/89 |
| 2003/0222882 | A1 * | 12/2003 | Jeffrey et al. | ............... | 345/560 |
| 2006/0038836 | A1 * | 2/2006 | Abe et al. | ................... | 345/690 |
| 2007/0110332 | A1 * | 5/2007 | Asano et al. | ................ | 382/275 |
| 2008/0204483 | A1 * | 8/2008 | Abe et al. | ................... | 345/690 |

* cited by examiner

*Primary Examiner*—Aaron W Carter
(74) *Attorney, Agent, or Firm*—Cohen Pontani Lieberman & Pavane LLP

(57) ABSTRACT

An image display apparatus having: an image display section to display images; a data transmitting section to transmit image data to the display section; and a data processor to update images on the display section in a predetermined order by processing the image data between the display section and the data transmitting section, wherein the data processor includes an image updating section to display an image of a displaying timing, by averaging the image with predetermined number of frames of images to be displayed before and after the image at the displaying timing based on an updating speed of images at the display section.

21 Claims, 6 Drawing Sheets

IMAGE DISPLAY APPARATUS, IMAGE DISPLAY METHOD AND IMAGE DISPLAY PROGRAM

This application is based on Japanese Patent Application No. 2004-159532 filed oh May 28, 2004 in Japanese Patent Office, the entire content of which is hereby incorporated by reference.

BACKGROUND OF THE INVENTION

The present invention relates to an image display apparatus, an image display method and an image display program, which continuously display plural frames of still images.

In recent years, an image database, which is capable of storing a large quantity of digital still images, has been developed. As a method to enable a user to select a desired still image from this image data base, for example, a method which enables a user to select an image by updating and displaying stored images in order at a high speed (for example, refer to patent literatures 1-3).

[Patent literature 1] JP-A No. 5-94503 (Hereinafter, JP-A refers to Japanese Patent Publication Open to Public Inspection)

[Patent literature 2] JP-A No. 5-232914

[Patent literature 3] JP-A No. 5-324783

However, human visual characteristics may present uncomfortable feeling when extreme blinks appear in a displayed image plane. Therefore, in the case of plural frames of still images being updated and displayed at a high speed as disclosed in the above patent literatures, a user will feel a blink each time when an image is updated since there is small correlations among images, which results in providing a user with stress.

SUMMARY OF THE INVENTION

An object of this invention is to provide an image display apparatus, an image display method and an image display program, which are able to update and display plural frames of still images without making a user feel stress.

One aspect of this invention to achieve this object is an image display apparatus which is equipped with an display section to display images, a data transmitting section to transmit image data to the aforesaid display section, and a data processor to update images in a predetermined order on the aforesaid display section by processing an image data between the aforesaid display section and the aforesaid data transmitting section; wherein the aforesaid data processor is provided with a filter section which displays an image at the displaying timing by being averaged with the predetermined frames of images displayed before and after said image based on an updating speed of images at the aforesaid display section.

DETAILED DESCRIPTION OF THE INVENTION

Figure 1:
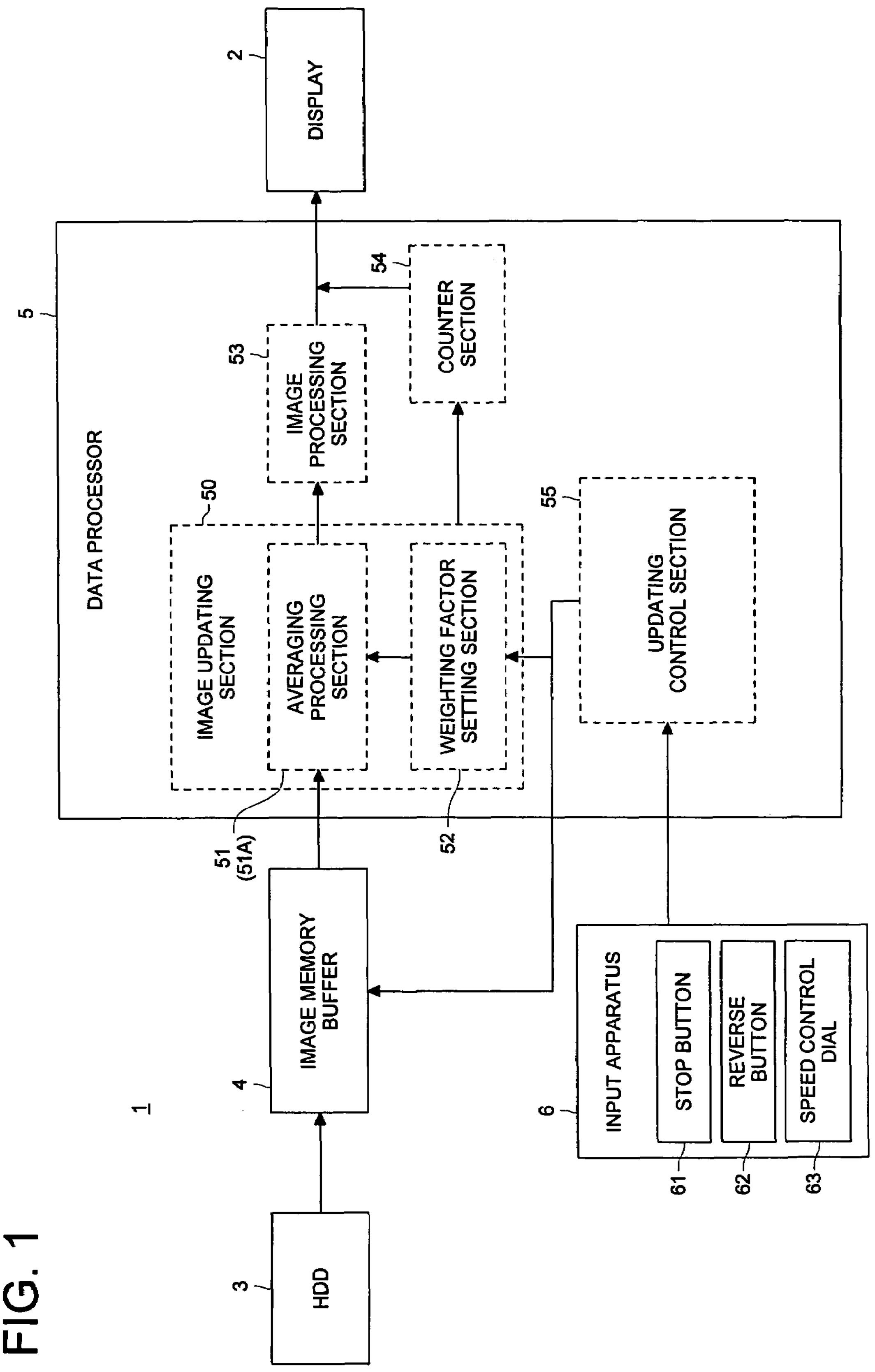
FIG. 1 is a block diagram showing a brief constitution of an image display apparatus according to this invention.

The aforesaid problems can be solved by the embodiments of the following items.

(1) An image display apparatus which is equipped with an image display section to display images, a data transmitting section to transmit image data to the aforesaid display section, and a data processor to update images in a predetermined order on the aforesaid display section by processing image data between the aforesaid display section and the aforesaid data transmitting section; wherein the aforesaid data processor is provided with a filter section to display an image at the displaying timing, by averaging the image with the predetermined number of frames of images displayed before and after said image based on an updating speed of images at the aforesaid display section.

Herein, an image means a digital still image.

Further, an updating speed means a number of image frames updated per a unit time, and to update means to display an image comprising different image data.

Further, "to display an image by averaging" means to display a signal value of an image for each pixel of a display section by averaging the signal values. To average may mean either to average signal values as they are or to average them after having been weighted.

According to the image display apparatus of item (1), since a filter section in a data processor displays an image at the displaying timing on a display section by averaging with a predetermined frames of images displayed before and after this image based on an updating speed of images on a display section, correlations among displayed images will increase compared to a conventional case. Therefore, since a blinks caused by updating of images are decreased, plural frames of images can be updated and displayed without giving a stress to a user, being different from conventional cases.

Herein, a data transmitting section may read out image data which is to be transmitted to a display section from a memory device such as a hard disc drive (HDD), may read out the image data from a recording medium such as a Floppy Disc™ (FD) or a CD-ROM, or may receive the image data from a circuit such as an inter net.

(2) In the image display apparatus of item (1) equipped with a first input section at which a reverse indication to indicate reversing the displaying order of images at the aforesaid image display section and a stop indication to indicate stopping update of images in the aforesaid image display section are input by a user, wherein the aforesaid data processor updates images in the reverse order to the aforesaid predetermined order at the aforesaid image display section by decreasing an updating speed when the aforesaid reverse indication is input at the aforesaid first input section, and update of images at the aforesaid image display section is stopped simultaneous with an image of the displaying timing being displayed on the aforesaid image display section when the aforesaid stop indication is input at the aforesaid first input section.

According to the image display apparatus of item (2), in the case of intending to stop update of display at a certain image, since a data processor updates images in the reverse order at an image display section even when a target image has passed due to a large updating speed, it is possible to stop updating images by inputting a stop indication when the target image is displayed again. Further, since an updating speed is decreased when a display section updates in the reverse order, it is possible to easily input a stop indication before the target image is updated by the next image, because an updating speed is decreased when a display section updates images in the reverse order.

Herein, an updating speed is a positive value regardless of an updating order.

(3) The image display apparatus of item (2) is characterized in that the aforesaid image display section displays an indicator showing a number of updated image frames on said display section together with an image.

According to the image display apparatus of item (3), since an indicator showing a number of updated image frames on a display section is displayed together with an image on the display section, it is possible to know how many frames have been displayed before the target image by referring to an indicator on a display section, even when said image has been passed due to a large updating speed in the case of intending to stop updating at a certain image. Therefore, when an image is updated at an image display section in the reverse order, it is possible to surely stop update of displayed images at the displaying timing of a target image.

The image display apparatus of item (2) is characterized by being equipped with a voice output device which outputs a voice at each time of updating an image on the aforesaid display section.

According to the image display apparatus of item (4), since a voice is output at each time of updating an image on a display section from a voice output device, it is possible to know how many frames before a target image has been displayed by counting voice outputs from a voice output device even when the target image has passed due to a large updating speed in the case of intending to stop at a certain image. Therefore, when an image is updated at an image display section in the reverse order, it is possible to surely stop updating of displayed images at the displaying timing of the target image.

(5) The image display apparatus described in any one of items (1)-(4) is characterized by being equipped with a second input section at which a speed change indication to indicate changing an updating speed of images on the aforesaid display section is input by a user, and the aforesaid data processor changes updating speed of an image on the aforesaid display section and the aforesaid predetermined number of frames based on the speed change indication when the aforesaid speed change indication is input at the aforesaid second input section.

According to the image display apparatus of item (5), since an updating speed of images on a display section is changed based on a speed change indication which is input at the second input section, a user can update images at a favorite updating speed. Further, it is possible to set an amplitude-frequency characteristic at a filter section not as to generate a moiré.

Further, since the aforesaid predetermined number of frames is changed based on a speed change indication, it is possible to increase correlations among images displayed, for example, by increasing the aforesaid predetermined number of frames when an updating speed is large, and by displaying many images being averaged. Further, it is possible to enhance a capability to identify an image of the displaying timing by decreasing the aforesaid predetermined number of frames when an updating speed is small, and it is also possible to display an image of the displaying timing as it is by setting the aforesaid predetermined number of frames to 0.

(6) The image display apparatus of item (5) is characterized in that the aforesaid filter section displays the aforesaid image of the displaying timing, being weighting averaged with the aforesaid predetermined frames of images employing each separate weighting factor, on the aforesaid image display section in the case of updating images on the aforesaid display section at an updating speed not less than a predetermined updating speed, and the aforesaid weighting factors are set so as to make a constant amplitude-frequency characteristic before and after change of an updating speed based on an updating speed in the case of the aforesaid updating speed change indication is input at the aforesaid second input section.

Herein, an amplitude-frequency characteristic of a filter section is represented by a relationship curve between an amplitude of a signal value and a frequency, with respect to each pixel.

Further, that an amplitude-frequency characteristic is nearly constant before and after change of an updating speed means that a variation rate of a frequency to give an amplitude of 50% (or 0.5) is within a range of ±50% between before and after change of an updating speed, in an amplitude-frequency curve obtained by a discrete Fourier transform of a variation of an output value, for example, in the case of continuous display of images by inserting only one frame of a white solid image among a plural frames of black solid images.

According to the image display apparatus of item (6), since an amplitude-frequency characteristic of a filter section is nearly constant before and after change of an updating speed, an effect similar to that described in item (1) can be obtained even an updating speed on a display section is changed by input of a speed change indication at the second input section.

(7) The image display apparatus described in any one of items (1)-(6) is characterized in that the aforesaid data processor changes at least one of a contrast, a chroma and a resolution of a part of or the whole of a displayed image on the aforesaid display section, based on an updating speed of images.

According to the image display apparatus of item (7), since a data processor changes at least one of a contrast, a chroma and a resolution of a part of or the whole of a displayed image on the aforesaid display section, based on an updating speed of images, it is possible to decrease visual stimulus against a user even when a data updating speed is large, resulting in surely decreasing stress to a user compared to before.

Herein, a part of a displayed image is preferably a region giving a large visibility, and is such as a central part of an image plane.

(8) An image display method provided with a data transmitting process to transmit an image data from a data transmitting apparatus to a display apparatus, a displaying process to display an image employing the aforesaid display apparatus, and a data updating process to update images on the aforesaid display apparatus in a predetermined order by processing an image data between the aforesaid display apparatus and the aforesaid data transmitting apparatus, wherein, in the aforesaid data processing, performed is a filter processing to display an image at the displaying timing by being averaged with a predetermined frames of images displayed before and after this image, based on an updating speed of an image on the aforesaid display apparatus.

According to item (8), since an image at the displaying timing is displayed by being averaged with a predetermined frames of images displayed before and after this image, based on an updating speed of an image on the aforesaid display apparatus, correlations among displayed images are increased compared to before. Therefore, it is possible, different from before, to display plural frames of still images by switching without causing stress to a user because blinks due to image update are decreased.

(9) The image display method of item (8), wherein, in the afore said data processing process, images are updated in the order reverse to the aforesaid predetermined order at a decreased updating speed based on a reverse indication which indicates to reverse the displaying order of images on the aforesaid display apparatus, and image update on the aforesaid display apparatus is stopped as well as an image at the displaying timing is displayed, base on a stop indication to indicate stopping image update on the aforesaid display apparatus.

According to item (9), in the case of intending to stop image update at a certain image, since a display apparatus updates images in the reverse order by inputting a reverse indication even when a target image has passed due to a large updating speed, it is possible to stop image update by inputting a stop indication when the target image is displayed again. Further, since an updating speed become small when images are updated in the reverse order, it is possible to input a stop indication easily before the target image is updated by the next image.

(10) The image display method of item (9), wherein an indicator to present a number of updated image frames on the aforesaid display apparatus, is displayed together with an image in the aforesaid display process.

According to item (10), in the case of intending to stop update at a certain image, it is possible to recognize how many frames before the target image has been displayed by referring to an indicator on a display apparatus even when a target image has passed due to a large updating speed. Therefore, it is possible to surely stop updating of displayed images at the displaying timing of a target image when images are updated in the reverse order on a display apparatus.

(11) The image display method of item (9), wherein, in the aforesaid display process, a voice is output from a voice output device each time when an image is updated on the aforesaid display apparatus.

According to item (11), in the case of intending to stop image update at a certain image, it is possible to know how many frames before a target image has been displayed by counting the voice which is output from a voice output device even when the target image has passed due to a large updating speed. Therefore, in the case of updating images in the reverse order on a display apparatus, it is possible to surely stop updating of displayed images at the displaying timing of the target image.

(12) The image display method described in any one of items (8)-(11), wherein, in the aforesaid data processing process, an image updating speed on the aforesaid display apparatus and the aforesaid predetermined number of frames are changed based on a speed change indication which indicates to change an image updating speed on the aforesaid display apparatus.

According to item (12), since an image updating speed on a display apparatus can be changed by inputting a speed change indication, a user is possible to update images at a favorite updating speed. Further, it is possible to set an amplitude-frequency characteristic at a filter processing process not as to generate moiré.

Further, it is possible to increase correlations among displayed images, for example, by increasing the aforesaid number of frames to display many images being averaged in the case of a large updating speed. Further, it is possible to enhance a capability to distinguish an image at the displaying timing by decreasing the aforesaid predetermined number of frames in the case of a small updating speed, and also possible to display an image at the displaying timing as it is by setting the aforesaid predetermined number of frames to 0.

(13) The image display method of (12), wherein, in the aforesaid filtering process, in the case of updating images on the aforesaid display apparatus at an updating speed not less than a predetermined updating speed, the aforesaid image of displaying timing, together with the aforesaid predetermined frames of images, are displayed on the aforesaid display apparatus by being weighting averaged with each independent weighting factor, and said weighting factors are set based on an updating speed so as to provide an approximately constant amplitude-frequency characteristic in the aforesaid filtering process before and after change of the updating speed.

According to item (13), it is possible to achieve an effect similar to that of the invention described in item (8) by providing an approximately constant amplitude-frequency characteristic in the aforesaid filtering process before and after change of the updating speed even when an updating speed of images on a display apparatus is changed by a speed change indication.

(14) The image display method described in any one of items (8)-(13), wherein, in the aforesaid data processing process, at least one of a contrast, a chroma and a resolution of a part of or the whole of a displayed image on the aforesaid display apparatus is changed based on an updating speed of images.

According to item (14), it is possible to decrease a visual stimulus against a user by changing at least one of a contrast, a chroma and a resolution of a part of or the whole of a displayed image on the aforesaid display apparatus based on an updating speed of images, in a data processing process, even when an updating speed is large. Therefore stress of a user can be surely decreased compared to before.

(15) An image display program is characterized by making a computer, which performs a data transmitting process to transmit image data from a data transmitting apparatus to a display apparatus, a display process to display an image on the aforesaid display apparatus, and a data processing to update an image in the predetermined order on the aforesaid display apparatus by processing an image data between the aforesaid display apparatus and the aforesaid data transmitting apparatus, perform a filter processing in the aforesaid data processing to enable displaying an image of displaying timing by averaging with predetermined frames of images which are displayed before and after this image, based on an updating speed of images on the aforesaid display apparatus.

According to item (15), since an image of the displaying timing is displayed by being averaged with predetermined frames of images displayed before and after this image based on an updating speed of images on a display apparatus, correlations among displayed images are increased compared to before. Therefore, it is possible to display plural frames of still images by being switched without making a user feel stress.

(16) The image display program of item (15) is characterized by making the aforesaid computer update images in the reverse order to the aforesaid predetermined order on the aforesaid display apparatus by decreasing an updating speed when a reverse indication to indicate stopping image update on the aforesaid display apparatus is ordered by a user.

According to item (16), in the case of intending to stop updating of ascertain image, it is possible to stop image update because images are updated in the reverse order on a display apparatus by inputting a stop indication when a target image is displayed again, even the target image has passed due to a large updating speed. Further, it is possible to easily input a stop indication before the target image is updated by the next image because an updating speed is decreased when a display apparatus updates images in the reverse order.

(17) The image display program of item (16), wherein an indicator to show a number of frames of updated images on the aforesaid display apparatus, is displayed together with an image.

According to item (17), since an indicator, which shows a number of frames of updated images on the aforesaid display apparatus, is displayed together with an image on a display apparatus, it is possible to know how many frames before a target image has been displayed by referring to an indicator on a display apparatus, even the target image has passed due to a large updating speed. Therefore, in the case of updating images in the reverse order on a display apparatus, updating of displayed images can be surely stopped at the displaying timing of a target image.

(18) The image display program of item (16) wherein a voice is output to the aforesaid computer from a voice output device, each time of image update on the aforesaid display apparatus.

According to item (18), since a voice is output from a voice output device each time of image update on a display apparatus, it is possible to recognize how many frames before a target image has been displayed by counting a voice, which is output from a voice output device each time of image update on a display apparatus, even when the target image has passed due to a large updating speed. Therefore, in the case of updating images in the reverse order on a display apparatus, it is possible to surely stop update of displaying images at the displaying timing of the target image.

(19) The image display program described in any one of items (15)-(18), wherein an updating speed of images on the aforesaid display apparatus and the aforesaid predetermined number of frames are changed based on a speed change indication when the speed change indication to indicate changing an updating speed of images on the aforesaid display apparatus is ordered by a user.

According to item (19), since an updating speed of images on a display apparatus is changed based on a speed change indication, a user can update images at a favorite updating speed. Further, it is possible to set an amplitude-frequency characteristic in a filter processing not as to generate moiré.

Further, it is possible to increase correlations among displayed images, for example, by increasing the aforesaid number of frames to display many images being averaged in the case of a large updating speed. Further, it is possible to increase a capability to distinguish an image of the displaying timing by decreasing the aforesaid predetermined number of frames in the case of a small updating speed, as well as to display an image of the displaying timing as it is by setting the aforesaid predetermined number of frames to 0.

(20) The image display program of (19) is characterized by making the aforesaid computer display the aforesaid image of the displaying timing together with the aforesaid predetermined frames of images on the aforesaid display apparatus by being weighting averaged with each independent weighting factor and set said weighting factor based on an updating speed so as to make an amplitude-frequency characteristic in the aforesaid filtering process approximately constant before and after change of the updating speed in the case of the aforesaid speed change indication is ordered by a user.

According to item (20), it is possible to achieve an effect similar to that of the invention described in item (15) by making an amplitude-frequency characteristic in the aforesaid filtering process approximately constant before and after change of an updating speed even when the updating speed of images on a display apparatus is changed by a speed change indication.

(21) The image display program described in any one of items (15)-(20) is characterized by making the aforesaid computer change at least one of a contrast, a chroma and a resolution of a part of or the whole of displayed images on a display apparatus based on an updating speed.

According to item (21), since at least one of contrast, chroma and resolution of a part of or the whole of a displayed image on the aforesaid display apparatus is changed based on an updating speed of images in a data processing process, it is possible to decrease a visual stimulus against a user even when an updating speed is large. Therefore stress to a user can be surely decreased compared to before.

According to the embodiment described in items (1), (8) and (15), since blinks due to image update are decreased, plural frames of still images can be displayed while being switched without making a user feel stress, different from before.

According to the embodiment described in items (2), (9) and (16), an effect similar to that of the embodiment described in items (1), (8) and (15) is naturally achieved, as well as updating of images can be stopped by inputting a stop indication when a target image is displayed again. Further, it is possible to easily input a stop indication before the target image is updated by the next image.

According to the embodiment described in items (3), (4), (10), (11), (17) and (18), an effect similar to that of the embodiment described in items (2), (9) and (16) is naturally achieved, as well as it is possible to surely stop updating of displayed images at the displaying timing of a target image in the case of updating images in the reverse order on a display apparatus.

According to the embodiment described in items (5), (12) and (19), an effect similar to that of the embodiment described in any one of items (1)-(4), (8)-(11), and (15)-(18) is naturally achieved, as well as a user is possible to update an image at a favorite updating speed.

According to the embodiment described in items (6), (13) and (20), an effect similar to that of the embodiment described in items (1), (8) and (15) can be achieved.

According to the embodiment described in items (7), (14) and (21), an effect similar to that of the embodiment described in any one of items (1)-(6), (8)-(13), and (15)-(20) is naturally achieved, as well as it is possible to decrease a visual stimulus against a user. Therefore, stress to a user can be surely decreased compared to before.

THE PREFERRED EMBODIMENT

In the following embodiments of this invention will be explained referring to drawings. Herein, an image in the following embodiments refers to a digital still image.

First, an image display apparatus according to this invention will be explained. FIG. 1 is a block diagram showing a outlined structure of image display apparatus 1.

As shown in this drawing, image display apparatus 1 is equipped with such as display (a display section, a display apparatus) 2 and HDD 3 which memorize plural frames of images.

Display 2 is possible to display color images of at least 30 frames per second. As such display 2, for example, utilized are such as a color CRT and a color liquid crystal and a PDP. Herein, in this embodiment, explanation is made based on a constant scan speed of images in display 2 of 30 frames per second; however, the scan speed may be variable.

HDD 3 memorizes image data as an image data base form and memorizes by giving a serial number to each image data in this embodiment. Further, in HDD 3, image data is arranged based on a photographed date.

Further, in an image data base of HDD 3, image data of an image, in which a person is photographed, is memorized by being provided with position information of the face portion of a photographed object. Herein, to detect a position of the face portion in an image, a software such as Neo Face™ (a product name, manufactured by NEC Corp.) can be utilized.

Image memory buffer (data transmitting section, data transmitting apparatus) 4 and data processor (computer) 5 are arranged between HDD 3 and display 2.

Image memory buffer 4 reads out image data and the aforesaid face position information in a predetermined order (hereinafter, refers to the forward direction order, for convenience) or the reverse order from HDD 3 based on an indication from data processor 5, and transmits them to data processor 5.

Data processor 5 is capable to control image memory buffer 4 and display 2, and equipped with such as image updating section (filter section) 50, image processing section 53, counter section 54 and updating control section 55.

Such as these image updating section, image processing section 53, counter section 54 and updating control section 55 exhibit their functions by an image display program according to this invention being read out by CPU from ROM and developed in a working region.

Herein, image updating section 50 updates plural frames of images on display 2 in the aforesaid forward direction order or in the backward direction order based on an image data which is transmitted from image memory buffer 4, and is equipped with averaging processing section 51 and weighting factor setting section 52.

Averaging processing section 51 functions as a so-called low pass filter and displays an image of the displaying timing on display 2, by being weighting averaged with total 4 frames of images, each 2 frames displayed before and after said image, in the case of updating images on display 2 at an updating speed not smaller than 6 frames per second. Herein, to weighting average images means to average image signals by being multiplied with a weighting factor for each pixel of display 2.

Figure 2:
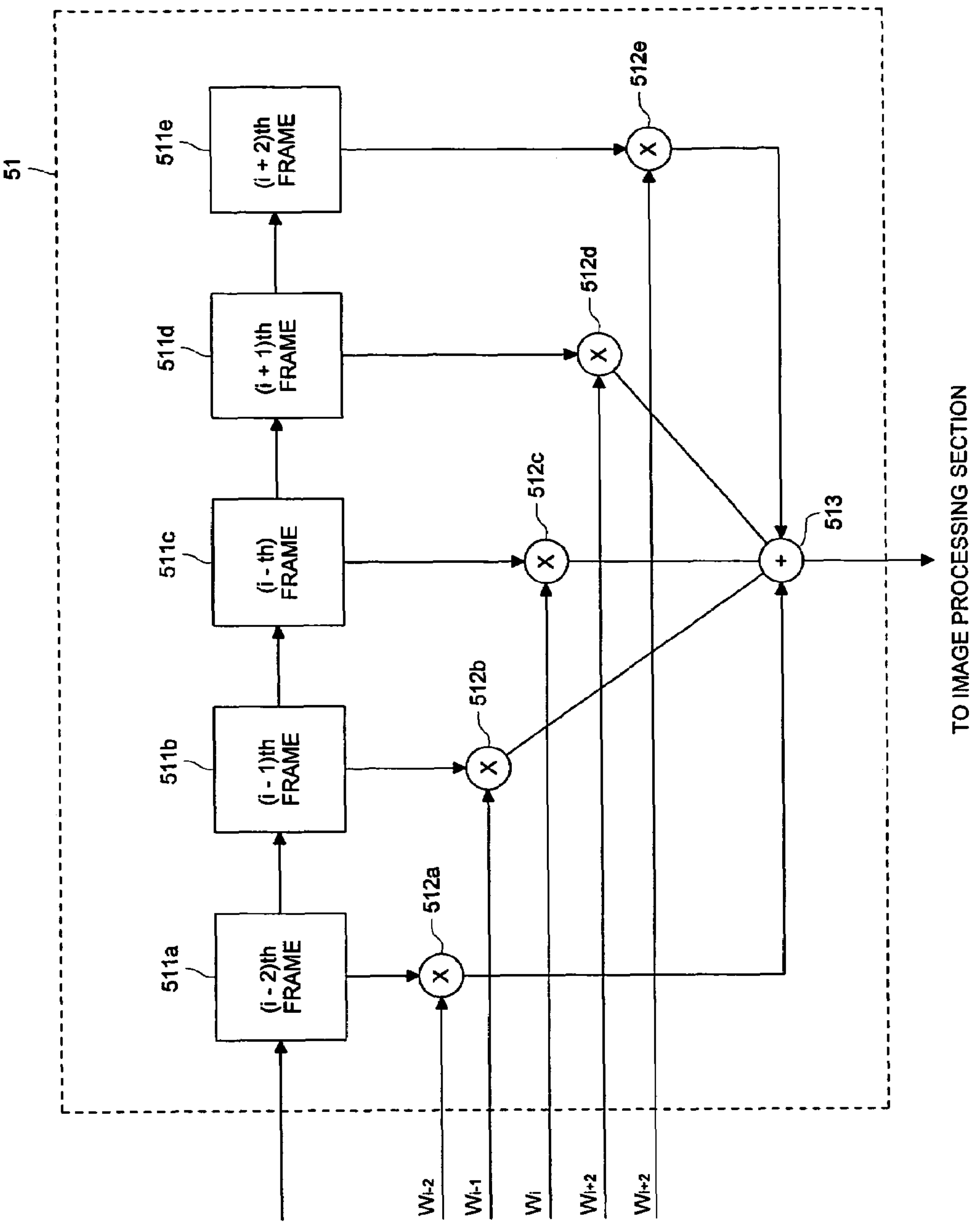
FIG. 2 is a block diagram showing a brief constitution of an averaging processing section.

Concretely, averaging processing section 51 is equipped with buffers 511*a*-511*e*, multiplying circuits 512*a*-512*e* and addition circuit 513, as shown in FIG. 2.

Buffers 511*a*-511*d* transmit image data, which has been memorized inside, to downstream (the right side in the drawing) buffers 511*b*-511*e* and multiplying circuits 512*a*-512*d* at a predetermined timing simultaneous with memorizing image data which has been newly received. Further, buffer 511*e* transmits image data, which has been memorized inside, to multiplying circuit 512*e* at a predetermined timing simultaneous with memorizing image data which has been newly received. In the following, for convenience of explanation, image data memorized in buffers 511*a*-511*e* are designated as image data of the (i−2)th frame—the (i+2)th frame and an image at the displaying timing is designated as an image of the i-th frame.

Multiplying circuits 512*a*-512*e* multiply image data of (i−2)th frame—(i+2)th frame, which are received from buffers 511*a*-511*e*, by weighting factors $W_{i-2}$–$W_{i+2}$ which will be described below and are received from weighting factor setting section 52, and transmit the results to addition circuit 513.

Addition circuit 513 adds up image data received from multiplying circuits 512*a*-512*e* and transmits the result to image processing section 53.

Weighting factor setting section 52 sets weighting factors $W_{i-2}$–$W_{i+2}$ and is designed to set weighting factors $W_{i-2}$–$W_{i+2}$ based on an updating speed so as to make an amplitude-frequency characteristic approximately constant even when an updating speed of images on display 2 is changed by updating control section 55. Herein, in this embodiment, an amplitude-frequency characteristic being approximately constant before and after change of an updating speed refers to that, in the case of images are continuously displayed by inserting only one frame of a white solid image among plural frames of black solid images, a variation ratio of amplitude to give an amplitude of 50% (or 0.5), in an amplitude-frequency curve obtained by a discrete Fourier transform of the change of output values, is in a range of ±50% between before and after change of an updating speed, that is in a range of 3-9 frames/sec. Herein, in the following explanation, $W_{i-1}=W_{i+1}$, $W_{i-2}=W_{i+2}$, $W_{i-2}+W_{i-1}+W_i+W_{i+1}+W_{i+2}=1$, for convenience.

Figure 3:
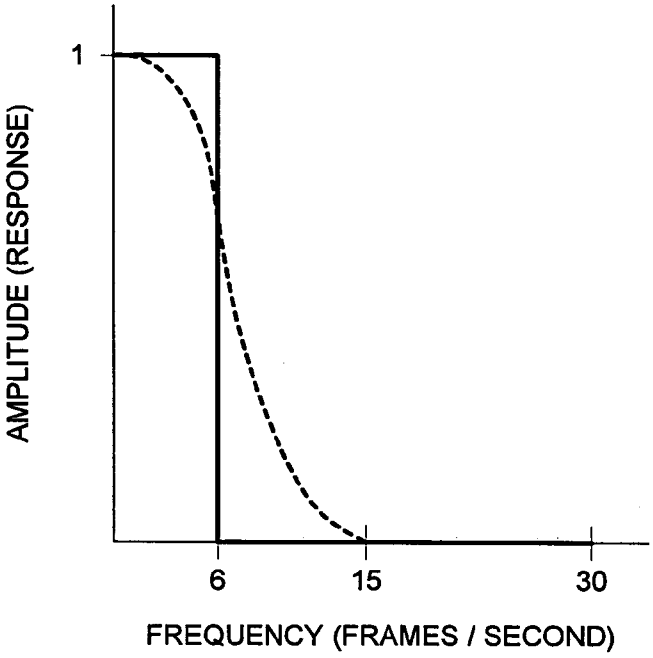
FIG. 3 is a drawing showing an example of an amplitude-frequency characteristic.

Concretely, weighting factor setting section 52 is designed to determine weighting factors $W_{i-2}$–$W_{i+2}$ by minimum square approximation of following matrix equation (1) so as to make a characteristic of a discrete Fourier transform of weighting factors $W_{i-2}$–$W_{i+2}$ similar to, for example, an aimed amplitude-frequency characteristic as shown by a solid line in FIG. 3.

Equation (1) (1)

$$\underbrace{\begin{bmatrix} 1 & 2\cdot 1 & 2\cdot 1 \\ 1 & 2\cdot\cos\frac{2\pi\cdot 1\cdot 1}{2\cdot L} & 2\cdot\cos\frac{2\pi\cdot 1\cdot 2}{2\cdot L} \\ 1 & 2\cdot\cos\frac{2\pi\cdot 1\cdot 1}{2\cdot L} & 2\cdot\cos\frac{2\pi\cdot 1\cdot 2}{2\cdot L} \\ \vdots & \vdots & \vdots \\ 1 & 2\cdot\cos\frac{2\pi\cdot(L-1)\cdot 1}{2\cdot L} & 2\cdot\cos\frac{2\pi\cdot(L-1)\cdot 2}{2\cdot L} \end{bmatrix}}_{F}$$

$$\underbrace{\begin{bmatrix} W_i \\ W_{i+1} \\ W_{i+2} \end{bmatrix}}_{A} = \underbrace{\begin{bmatrix} d_0 \\ d_1 \\ d_2 \\ \vdots \\ d_{L-1} \end{bmatrix}}_{D}$$

In this equation (1), matrix F is one comprised of DFT (discrete Fourier transform) factors and L represents a sample number of an amplitude-frequency characteristic. Further, matrix A is one comprised of weighting factors $W_{i-2}$–$W_{i+2}$ and matrix D is one comprised of sample values $d_i$ (i=0, 1, 2, - - - , L-1) of an amplitude-frequency characteristic shown by a solid line in FIG. 3.

Herein, a general solution of equation (1) will be explained. Supposing an inconsistent equation system of unknown quantity n and equation m, a minimum square solution of FA=D satisfies following equation (2) when F is a matrix of m×n. Herein, $F^T$ represents a transposed matrix of F.

$$F^T FA=F^T D \tag{2}$$

Therefore, when a matrix of F is linearly independent, $F^T F$ becomes inversed operation soluble and a single minimum square solution is obtained by following equation (3).

$$A=(F^T F)^{-1}F^T D \tag{3}$$

Herein, a calculation method of weighting factors $W_{i-2}$–$W_{i+2}$ as those described above is disclosed, for example, in "Digital Signal Processing of Signal Image" (Suguru Arimoto, published by Sangyo Tosho, pp. 155-157) and JP-A No. 7-121704.

Image processing section 53 displays image data, which is transmitted from averaging processing section 51, on display 2 by being subjected to a progressive rendering treatment. Herein, image processing section 53 is designed not to provide a progressive rendering treatment for the face portion in an image, based on the aforesaid face position information which is transmitted from HDD 3.

Herein, a progressive rendering treatment is a treatment to firstly display an image of a lower resolution and to gradually increase resolution of an image. As such a treatment, utilized can be treatments similar to Progressive JPEG and Interlace GIF.

Figure 4:
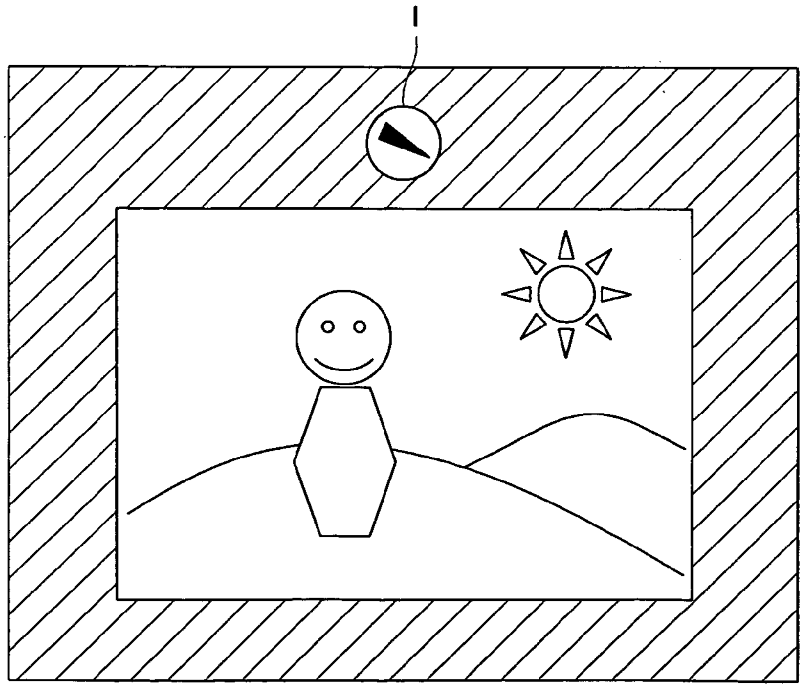
FIG. 4 is a drawing showing a displaying image plane of a display.

Counter section 54 counts the times of image updating on display 2 based on information transmitted from image updating section 50 and displays indicator I which indicates an updated number of frames, on the edge portion of an image plane of display 2, as shown in FIG. 4. Herein, in this embodiment, indicator I rotates clockwise by 45 degrees at each image update to the forward direction and rotates anti-clockwise by 45 degrees at each image update to the backward direction, however, this degree can be appropriately changeable and may be set to, for example, 22.5 degrees.

Updating control section 55 controls update of images on display 2 by image updating section 50.

Concretely, updating control section 55 is designed to stop transmitting image data from image memory buffer 4 to image updating section 50 by transmitting a stop indication signal which is transmitted from input apparatus 4 described later to image memory buffer 4. Further, updating control section 55 is designed to stop transmitting image data from image updating section 50 to display 2 by transmitting the aforesaid stop indication signal to averaging processing section 51 via weighting factor setting section 52.

Further, updating control section 55 is designed to change an updating speed of images on display 2 by changing a transmitting speed of image data from image memory buffer 4 to image updating section 50 and a transmitting speed of image data from image updating section 50 to display 2, based on a speed change indication signal which is transmitted from input apparatus 6.

Further, updating control section 55 is designed to reverse the updating order of images on display 2 by setting the order to read out image data from HDD 3 by image memory buffer 4 into the reverse order, based on a reverse indication signal which is transmitted from input apparatus 6.

Figure 5:
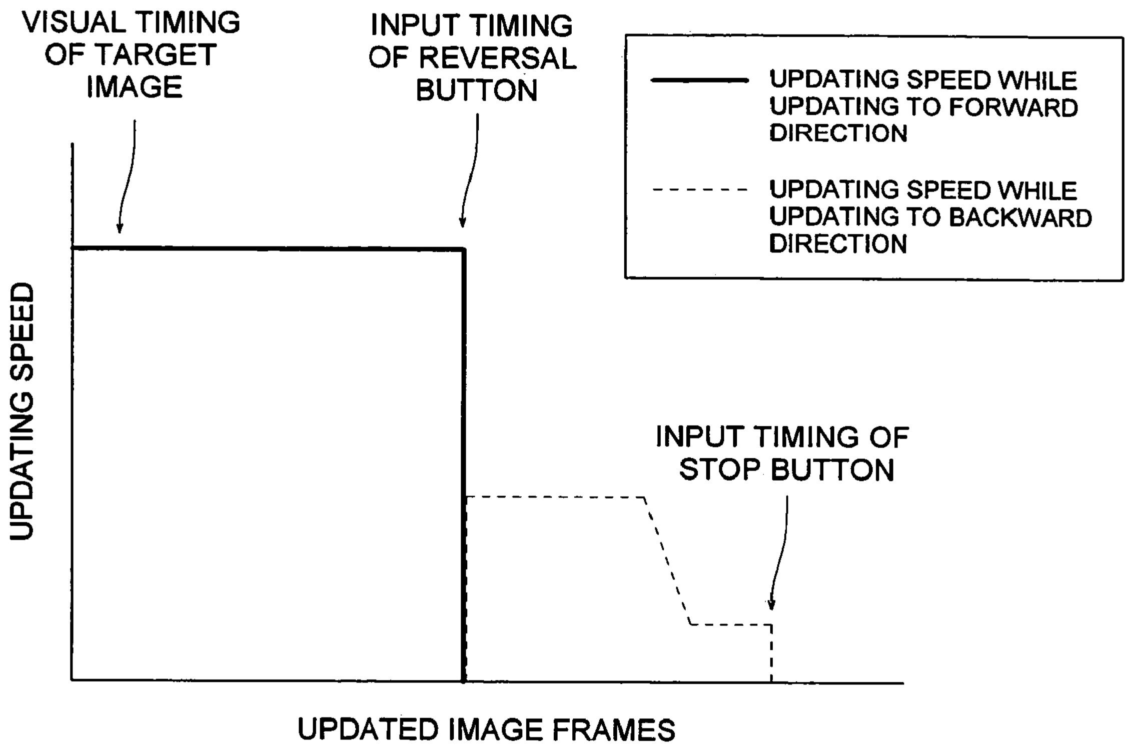
FIG. 5 is a drawing showing change of an updating speed in the case of updating images to the backward direction.
Figure 6:
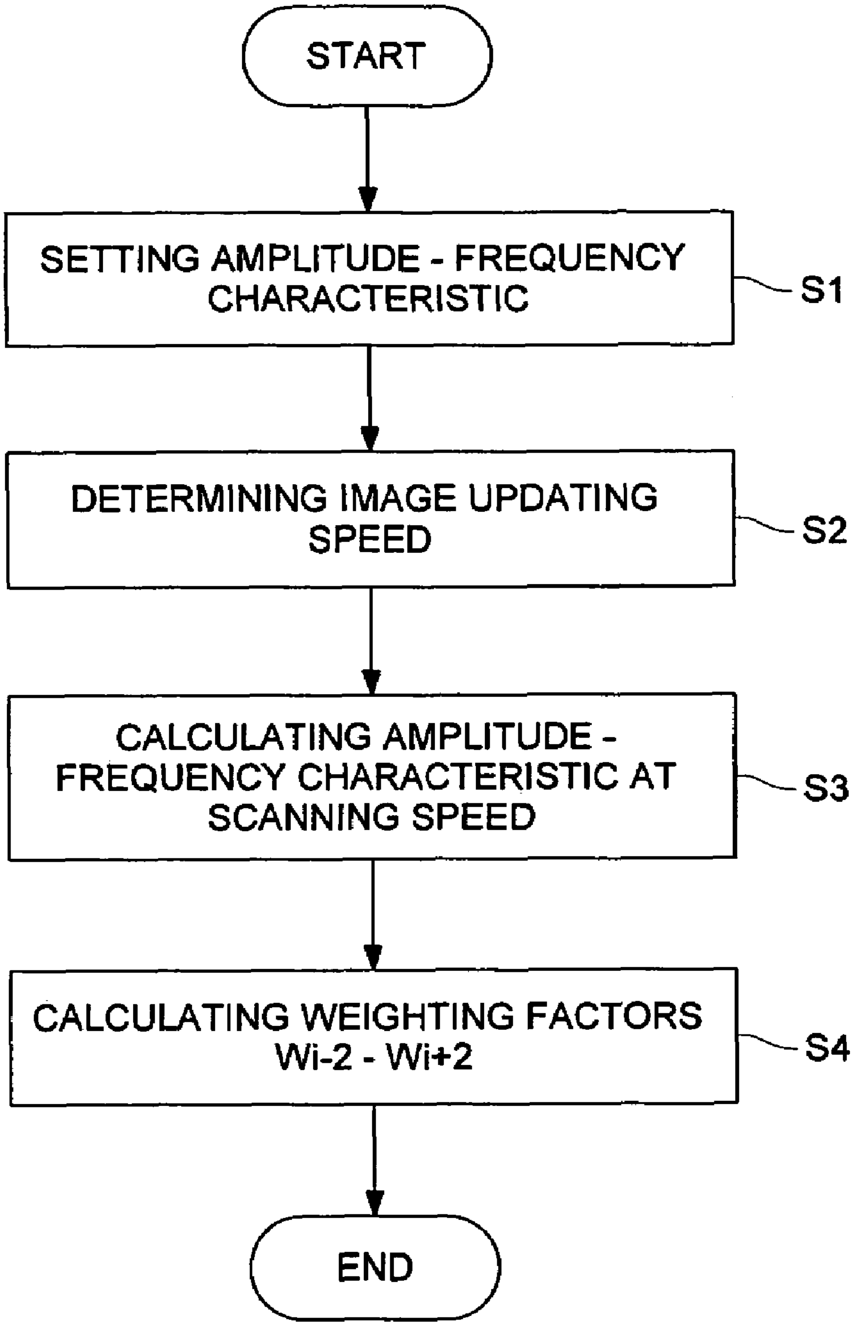
FIG. 6 is a flow chart showing a calculation processing of a weighting factor.

Further, updating control section 55 is designed to decrease an updating speed of images in the case of updating order of images on display 2 having been reversed, as shown in FIG. 5. Further, updating control section 55 is designed to calculate and memorize a number of image frames which has been updated during the time from a user recognizing the target image until pressing stop button 61 while updating images to the forward direction, and then to decrease an updating speed of images at the neighborhood of the memorized number of passed frames, for example, from a half number of passed frames, as soon as receiving the aforesaid reverse indication signal, based on the time from receiving the aforesaid reverse indication signal to receiving the aforesaid stop indication signal. Preferably, updating control section 55 is provided with a studying function to correct the aforesaid number of passed frames each time receiving a reverse indication signal and a stop indication signal.

Above data processor 5 is connected to input apparatus (the first input section, the second input section) 6 as shown in FIG. 1.

Input apparatus 6 is equipped with stop button 61, reverse button 62 and speed control dial 63.

At stop button 61, a stop indication of image update on display 2 is input by a user.

At reverse button 62, a reverse indication of an updating order of images on display 2 is input by a user.

At speed control dial 63, a speed change indication of an updating speed of images on display 2 is input by a user.

Next, an image display method according to this invention will be explained.

First, weighting factor setting section 52 in data processor 5 sets weighting factors $W_{i-2}$–$W_{i+2}$.

Concretely, first, a user sets an amplitude-frequency characteristic as shown by the solid line in FIG. 3 for weighting factor setting section 52 (step S1). Herein, a response value changes at 6 frames per second in the amplitude-frequency characteristic represented by the solid line in FIG. 3, however, an amplitude-frequency characteristic in which a response value changes at 15 frames per second may be set in the case that user's vision is not sufficiently sensitive.

Next, when a user set an updating speed of images by speed control dial 63 of input apparatus 6, weighting factor setting section 52 calculates an updating speed of images based on the information transmitted from speed control dial 63 (step S2).

Further, weighting factor setting section 52 normalizes an amplitude-frequency characteristic which has been set in step S1 by a scanning speed on display 2 against an image updating speed and calculates an amplitude-frequency characteristic at this scanning speed (step S3).

Then, weighting factor setting section 52 calculates five weighting factors $W_{i-2}$–$W_{i+2}$ so as to make discrete Fourier transform characteristic of weighting factors $W_{i-2}$–$W_{i+2}$ of similar to the amplitude-frequency characteristic which has been calculated in step S3 (step S4).

Next, image memory buffer 4 successively reads out image data from HDD 3 and transmits the data to display 2 via data processor 5 (data transmitting process).

Data processor 5, when receiving image data from image memory buffer 4, controls data transmission as well as transmits image data of the i-th frame, after having been averaged with image data of the (i−2)th frame, the (i−1)th frame, (i+1)th frame and the (i+2)th frame by use of a convolution (folding integration) method, to image processing section 53 (data processing process).

Concretely, first, buffers 511*a*-511*e* transmits image data of the inside as well as weighting factor setting section 52 transmits weighting factors $W_{i-2}$–$W_{i+2}$, to multiplying circuits 512*a*-512*e* of averaging processing section 51. Successively, multiplying circuits 512*a*-512*e* transmit image data, which has been multiplied with weighting factors $W_{i-2}$–$W_{i+2}$, to addition circuit 513. Then addition circuit 513 adds up image data and transmits the result to image processing section 53.

At this time, since values of weighting factors $W_{i-2}$ and $W_{i-1}$ are set smaller than a value of weighting factor $W_1$ when an updating speed is a predetermined updating speed, for example, less than 6 frames per second, image data of the i-th frame is transmitted as approximately it is to image processing section 53. In this manner, in the case that images are updated on display 2 at an updating speed less than a predetermined speed, ability of identifying images, which are displayed on display 2, is increased by transmitting image data of the i-th frame to image processing section 53 as it is.

On the other hand, since values of weighting factors $W_{i-2}$ and $W_{i-1}$ are set larger than a value of weighting factor $W_1$ when an updating speed is not less than a predetermined updating speed, image data of the i-th frame which has been weighting averaged with image data of the (i−2)th frame, the (i−1)th frame, the (i+1)th frame and the (i+2)th frame is transmitted to image processing section 53. In this manner, in the case that images are updated at an updating speed not less than a predetermined updating speed, correlations among images displayed on display 2 are increased by transmitting image data of the i-th frame, which has been averaged with image data of the (i−2)th frame, the (i−1)th frame, the (i+1)th frame and the (i+2)th frame, to image processing section 53.

Next, image processing section 53 provides the image data, which is transmitted from averaging processing section 51, with a progressive rendering treatment and displays the result on display 2 (display process). Thereby, a visual stimulus due to image update is depressed. Herein, since image processing section 53 does not provide the face portion of an image with a progressing rendering treatment based on the aforesaid face position information from HDD 3, the face portion of an image is displayed at a high resolution from the beginning. Therefore, deterioration of image identification capability is prevented.

Further, counter section 54 displays indicator I at the edge portion of an image on display 2.

Thereafter, image updating section 50 displays plural frames of images on display 2 by being updated to the forward direction. Further, counter section 54 displays an updated frame number of images by indicator I. Thereby, it is possible to recognize how many frames before the target image has been displayed even when the target image has passed due to a large updating speed.

Successively, a movement of image display apparatus 1, in the case of speed control dial 63 being operated by a user during continuous display of images, will be explained.

In this case, updating control section 55 changes an updating speed on display 2 by changing a transmitting speed of image data from image memory buffer 4 to image updating section 50 and a transmitting speed of image data from image updating section 50 to display 2, based on a speed change indication from input apparatus 6.

Further, updating control section 55 changes weighting factors $W_{i-2}$–$W_{i+2}$ based on an updating speed, similar to step S2-step S4 described above, so as to make a filter characteristic of averaging processing section 51 approximately constant before and after change of an update speed. Thereby, image data of the i-th frame is transmitted as it is to image processing section 53 when an updating speed after change is small, while image data of the i-th frame which has been weighting averaged with image data of the (i−2) frame, the (i−1) frame, the (i+1) frame and the (i+2) frame are transmitted to image data processing section 53, when an updating speed after change is large.

Herein, updating control section 55 at this time may change a number of image data frames which are weighting averaged with image data of the i-th frame by making any one value of weighting factors $W_{i-2}$, $W_{i-1}$, $W_{i+1}$ and $W_{i+2}$ be 0. Further, updating control 55 may display an image of the i-th frame as it is by making all of weighting factors $W_{i-2}$, $W_{i-1}$, $W_{i+}1$ and $W_{i+2}$ be 0.

Successively, a movement of image display apparatus 1, in the case of stop button 61 being operated by a user during continuous display of images, will be explained.

In this case, updating control section 55 displays an image of the displaying timing on display 2 and stops updating of images on display 2. Concretely, updating control section 55 stops transmission of image data from image memory buffer 4 to image updating section 50 and transmission of image data from image updating section 50 to display 2, by transmitting a stop indication signal from input apparatus 6 to image memory buffer 4 and image updating section 50. Thereby, updating of images stops in a state of an image of the displaying timing being displayed on display 2.

Successively, a movement of image display apparatus 1, in the case of reverse button 62 being operated by a user during continuous displaying of images, will be explained.

In this case, updating control section 55 updates images on display 2 at a smaller updating speed in the reverse order against a predetermined order. Thereby, images are updated in the reverse order and a target image is displayed again even when the target image has passed due to a large updating speed.

Further, counter section 54 rotates indicator I clockwise by 45 degrees at each image update. Thereby, it is possible to know how many frames ahead the target image will be displayed in the case of updating images to the backward direction.

According to the above image display method, in the case of updating images at an updating speed not less than a predetermined updating speed on display 2, it is possible to depress blinks of an image caused by image update because correlations among images displayed on display 2 can be enhanced compared to before. Therefore, different from before, plural frames of images can be displayed by being switched on display 2 without making a user feel stress.

Further, in the case of intending to stop updating at a certain image, since it is possible to update images in the reverse order and display a target image again by operating reverse button 62, image update can be stopped by operating stop button 61 when this image is displayed again. Further, since updating speed is become smaller when display 2 updates images in the reverse order, it is easy to operate stop button 61 before the target image is updated by the next image. In addition to this, since it is possible to know in advance how many frames ahead the target image will be displayed by referring to indicator I when display 2 updates images in the reverse order, updating of the target image can be surely stopped at the displaying timing of the target image.

Further, since an image updating speed on display 2 can be changed by operating speed control dial 63, a user can update images at a favorite updating speed. Further, it is possible to set an amplitude-frequency characteristic of averaging processing section 51 not as to generate moiré.

Herein, in the above embodiment, it was explained that image data of the (i−2)th frame—the (i+2)th frame are weighting averaged, however, these image data may be subjected to discrete Fourier transform, the obtained spectra being weighting calculated and the calculated results may be subjected to a reverse Fourier transform to perform weighting average of image data. In this case, as shown by the solid line in FIG. 3, it is possible to surely change a response value suddenly from 1 to 0 at a certain updating speed (6 frames per second in FIG. 3).

Further, averaging processing section 50 was explained to function as a low pass filter; however, this function may be made to be changeable by such as a switch of input apparatus 6.

Further, data processor 5 was explained to transmit image data, which is transmitted from image memory buffer 4, to display 2 while being successively subjected to a data processing, however, image data having been subjected to a data processing may be memorized in such as a memory device being connected outside in advance and the image data may be transmitted from this memory device to display 2. In this case, update of images on display 2 can be performed at higher speed because of a real time data processing is not required.

Further, data processor 5 is explained as to perform a progressive rendering treatment of image data by image processing section 53 and to display images on display 2, however, may display images by being made into a thumbnail. Also in this case, it is possible to decrease visual stimulus due to image updating.

Further, data processor 5 is explained as to display the face portion in an image at a high resolution from the beginning, however, the face portion may be displayed by being magnified.

Further, updating control section 55 has been explained as to decrease updating speed as well as to reverse the updating order of images on display 2 at receiving a reverse indication signal, however, images from one at the displaying timing to one having been displayed a predetermined frames before may be selectively displayed in a table.

Further, averaging processing section 51 has been explained as not to weighting average plural frames of images in the case of updating images on display 2 at an updating speed of less than 6 frames per second, however, weighting average may not be performed also in the case that images exhibiting no visual stimulus such as a Motion JPEG image are displayed on display 2. To identify such images, utilized can be a method in which two frames of images which are continuously arranged in HDD 3 are identified based on the degree of correlations among images after having been enlarged, reduced, transferred or rotated by means of an affine transformation.

Further, it has been explained that weighting factors $W_{i-2}$–$W_{i+2}$ are changed based on an updating speed of images, however, photographed intervals among images may be calculated from time stamps in image data and weighting factors $W_{i-2}$–$W_{i+2}$ may be changed according to these photographed intervals. Concretely, since correlations among images are considered to be large when photographed intervals are small, it is preferable that weighting factor $W_i$ is increased while weighting factors $W_{i-2}$, $W_{i-1}$, $W_{i+1}$ and $W_{i+2}$ are decreased. Further, since correlations among images are considered to be small when photographed intervals are large, it is preferable that weighting factor $W_i$ is decreased while weighting factors $W_{i-2}$, $W_{i-1}$, $W_{i+1}$ and $W_{i+2}$ are increased. Thereby, identification of images is enhanced when images having a larger correlation are continuously displayed, while visual stimulus is depressed when images having a smaller correlation are continuously displayed.

Further, in averaging processing section 51, it has been explained that image data is processed by a pipe line mode employing buffer 511a-511e, however, image data may be processed by a cycling buffer mode.

Further, it has been explained that a number of updated image frames is shown by indicator I; however, it may be also suggested by outputting a voice from a speaker (a voice output device) at each image update.

Figure 7:
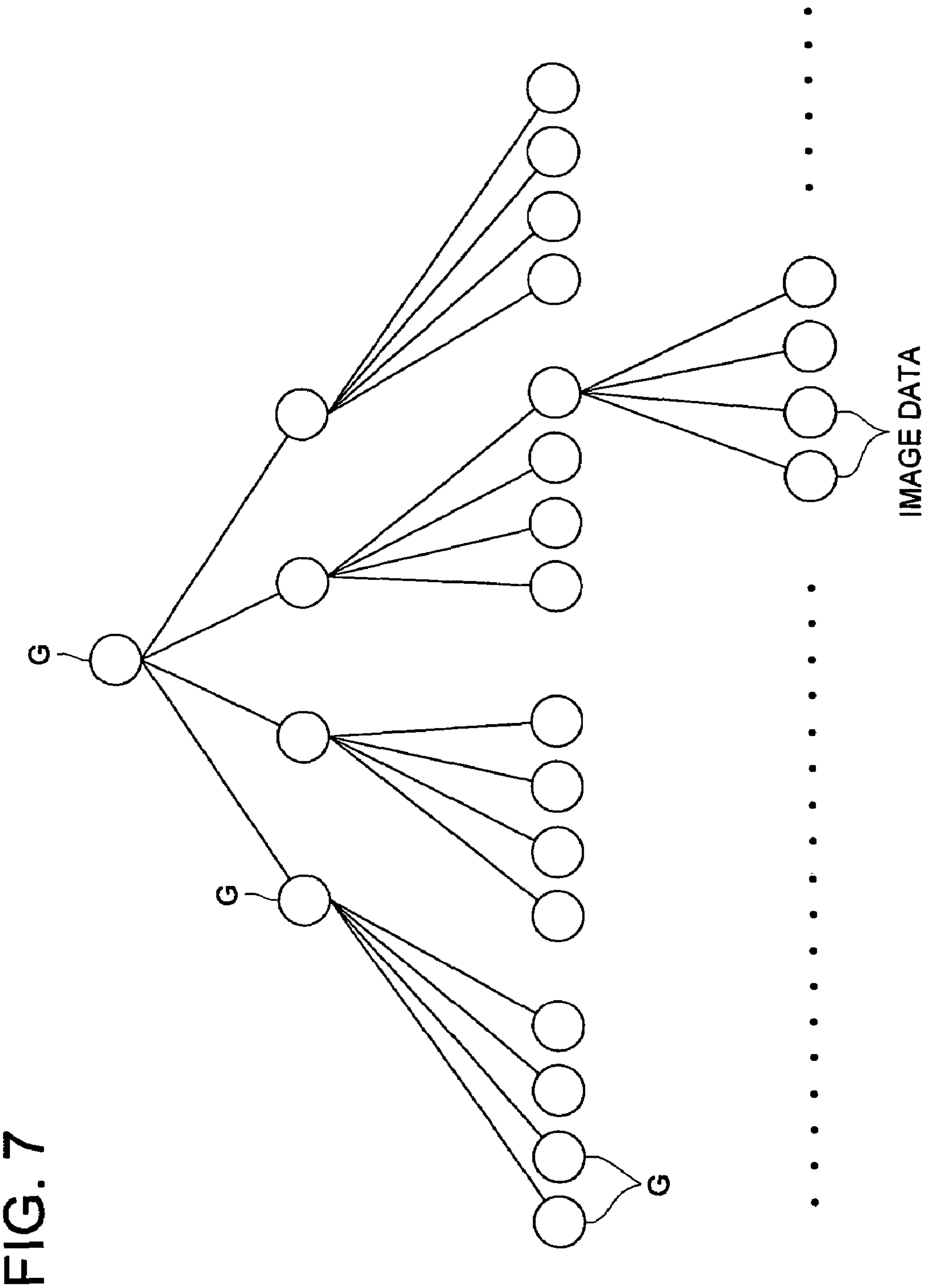
FIG. 7 is a drawing showing an example of an arrangement state of image data in a HDD.

Further, image data in HDD 3 has been explained to be arranged based on the photographed date, however, may be arranged based on RGB values or luminance. Further, HDD 3, as shown in FIG. 7, may be provided with a plural number of image groups G, - - - in an image data base. These image groups G, - - - are preferably formed based on the photographed date and arranged in the order of increasing average luminance. In such a case, a visual stimulus can be decreased when images are continuously displayed. Further, it is possible to decrease the processing times to compare an average luminance, compared to the case of arranging the whole image data based on luminance.

Further, the numbers of buffers 511 and multiplying circuits 512 have been explained to be 5, however, may be other numbers and the larger the better.

MODIFIED EXAMPLE OF EMBODIMENT

Next, a modified example of image display apparatus 1 will be explained. Herein, the same symbols are attached on the same components as those of the embodiment described above the explanations of which are abbreviated.

HDD 3 of image display apparatus 1A in this modified example, as shown in aforesaid FIG. 7, memorizes image data dividing into plural number of image groups G. Further, averaging processing section 51A is designed to display images on display 2 without being averaged between different image groups in the case of continuously displaying images of separate image groups G in HDD 3 on display 2.

According to such image display apparatus 1A, since an image displayed on display 2 suddenly changes at the time of image groups G being switched, it is possible to easily recognize that images of different image groups have been continuously displayed. On the other hand, since a blink caused at this time does not continue, it is possible to prevent a user from feeling stress similar to the above embodiment.

Herein, in the above modified example, it has been explained that images of separate image groups G are continuously displayed on display 2; however, images may be displayed by being inserted with a flip. In this case, it is possible to surely recognize that images of different image groups G have been displayed. In such a flip, the photographed date and title of an image are preferably displayed.

What is claimed is:

1. An image display apparatus for continuously displaying a plurality of frames of still images, wherein said still images are not images which are captured at a constant time interval to constitute a moving image, but said still images are discrete images captured at various time intervals, the image display apparatus comprising:

a display section to display still images;

a data transmitting section to transmit data of still images to the display section; and a data processor to update still images displayed on the display section in a predetermined order by processing the data of still images, the data processor being provided between the display section and the data transmitting section, wherein the data processor comprises an image updating section which updates the still images, by averaging a still image at a displaying time in the predetermined order with a predetermined number of frames of still images to be displayed successively before and after the image at the displaying time, wherein the image updating section determines the predetermined number of frames to be averaged with the still image at the display time in accordance with an updating speed of still images at the display section.

2. The image display apparatus of claim 1, further comprising:

a first input section where a reverse indication to indicate reversing a displaying order of still images on the image display section, and a stop indication to indicate stopping an updating of images in the image display section are input by a user, wherein the data processor updates images with the reverse order to the predetermined order on the image display section with a reverse updating speed slower than a forward updating speed, when the reverse indication is input at the first input section; and the data processor stops the updating of still images on the image display section and displays a still image of the displaying time, when the stop indication is input at the first input section.

3. The image display apparatus of claim 2, the image display section displays an indicator showing a number of still image frames which have been updated on the display section together with a still image.

4. The image display apparatus of claim 2, further comprises a voice output device, which outputs a voice at each time of updating a still image on the display section.

5. The image display apparatus of claim 1, further comprising:

a second input section where a speed change indication to indicate changing the updating speed of still images on the display section is input by a user, wherein the data processor changes the updating speed of still images on the display section and changes the predetermined number of frames of still images to be averaged with the still image of the displaying time based on the speed change indication, when the speed change indication is input at the second input section.

6. The image display apparatus of claim 5, wherein the image updating section updates the still image of the displaying time, by applying weighting average with the predetermined frames of still images each of which being employed with an individual weighting factor, to display on the image display section, in case of updating still images on the display section at an updating speed not less than a predetermined updating speed;

and the image updating section sets weighting factors so as to make a constant amplitude-frequency characteristic of the still images before and after change of the updating speed, in accordance with the updating speed substantially constant in cases where the updating speed change indication is input at the second input section.

7. The image display apparatus of claim 1, wherein the data processor changes at least one of a contrast, a chroma and a resolution of a part of or the whole of a displayed still image on the display section, in accordance with the updating speed of still images.

8. An image display method for continuously displaying plural frames of still images, wherein said still images are not images which are captured at a constant time interval to constitute a moving image, but said still images are discrete images captured at various time intervals, the image display method comprising:

transmitting image data if still images from a data transmitting section to a display section; and displaying still images on an image display section;

processing data to update still images on the display section in a predetermined order by processing the data of still images between the display section and the data transmitting section, wherein the processing data step comprises an image updating step to update the still images, by averaging a still image at a displaying time in the predetermined order with predetermined number of frames of still images to be successively displayed before and after the sill image at the displaying time, wherein the predetermined number of frames to be averaged with the still image at the displaying time is determined at the image updating step in accordance with an updating speed of images at the display section.

9. The image display method of claim 8, wherein the step of processing data comprises:

updating to reverse a displaying order of still images from the predetermined order on the image display section based on a reverse indication indicating to reverse the displaying order, with a reverse updating speed slower than a forward updating speed; and stopping the updating of still images on the image display section and displaying the still image of the displaying time based on a stop indication to stop the updating of the still images on the image display section.

10. The image display method of claim 9, in the step of displaying still images an indicator is displayed, which shows a number of still image frames which have been updated on the display section together with a still image.

11. The image display method of claim 9, in the step of displaying still images a voice is outputted from a voice output device, at each time of updating a still image on the display section.

12. The image display method of claim 8, wherein the step of processing data comprises:

changing the updating speed of still images on the display section and the predetermined number of frames still images based on a speed change indication to change the updating speed.

13. The image display method of claim 12, wherein the step of still image updating comprises:

updating to display the still image of the displaying time, by applying weighting average with the predetermined frames of still images each of which being employed with an individual weighting factor, to display on the image display section, in case of updating still images on the display section at an updating speed not less than a predetermined updating speed; and setting weighting factors so as to make a constant amplitude-frequency characteristic of the still images before and after change of the updating speed, in accordance with the updating speed.

14. The image display method of claim 8, wherein in the step of processing data, changed is at least one of a contrast, a chroma and a resolution of a part of or the whole of a displayed still image on the display section, in accordance with the updating speed of still images.

15. A computer-readable storage medium having stored thereon an image display program for continuously displaying plural frames of still images, wherein said still images are not images which are captured at a constant time interval to constitute a moving image, but said still images are discrete images captured at various time intervals, the image display program for making a computer execute the processes of:

transmitting data of still images from a data transmitting section to a display section; and displaying still images on an image display section;

processing data to update images on the display section in a predetermined order by processing the data of still images between the display section and the data transmitting section, wherein the processing data step comprises an image updating step to update the still images, by averaging to a still image at a displaying time in the predetermined order with a predetermined number of frames of still images to be successively displayed before and after the still image at the displaying time, wherein the predetermined number of frames to be averaged with the still image at the displaying time is determined at the image updating step in accordance with an updating speed still images at the display section.

16. The computer-readable storage medium of claim 15, wherein the processing data process comprises:

updating to reverse a displaying order of still images from the predetermined order on the image display section based on a reverse indication indicating to reverse the displaying order, with a reverse updating speed slower than a forward updating speed; and stopping the updating of still images on the image display section and displaying the still image of displaying time based on a stop indication to stop the updating of the images on the still image display section.

17. The computer-readable storage medium of claim 16, in the process of displaying still images an indicator is displayed, which shows a number of image frames which have been updated on the display section together with a still image.

18. The computer-readable storage medium of claim 16, in the process of displaying still images a voice is outputted from a voice output device, at each time of updating a still image on the display section.

19. The computer-readable storage medium of claim 15, wherein the processing data process comprises:

changing the updating speed of still images on the display section and the predetermined number of frames of still images based on a speed change indication to change the updating speed.

20. The computer-readable storage medium of claim 19, wherein the image updating process comprises:

updating to display the still image of the displaying time, by applying weighting average with the predetermined frames of still images each of which being employed with an individual weighting factor, to display on the image display section, in case of updating still images on the display section at an updating speed not less than a predetermined updating speed; and setting weighting factors so as to make a constant amplitude-frequency characteristic of the images before and after change of the updating speed, in accordance with the updating speed.

21. The computer-readable storage medium of claim 15, wherein in the processing data process, changed is at least one of a contrast, a chroma and a resolution of a part of or the whole of a displayed still image on the display section, in accordance with the updating speed of still images.

* * * * *